UNITED STATES PATENT OFFICE.

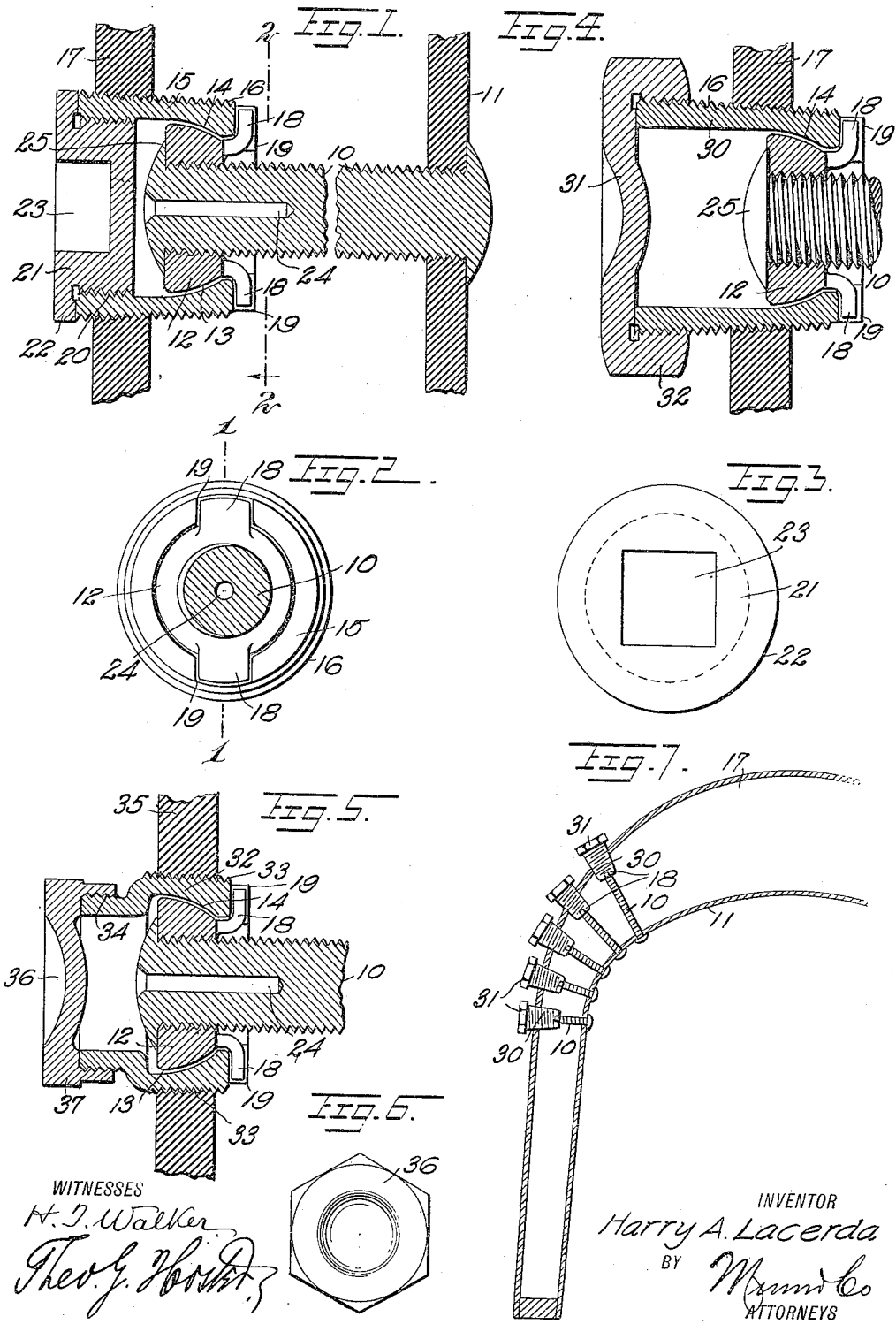

HARRY A. LACERDA, OF SCHENECTADY, NEW YORK.

STAY-BOLT.

1,172,145.

Specification of Letters Patent.

Patented Feb. 15, 1916.

Application filed October 12, 1915. Serial No. 55,421.

*To all whom it may concern:*

Be it known that I, HARRY A. LACERDA, a citizen of the United States, and a resident of Schenectady, in the county of Schenectady and State of New York, have invented a new and Improved Stay-Bolt, of which the following is a full, clear, and exact description.

The object of the invention is to provide a new and improved stay bolt for the fire boxes of boilers and other similar structures, and which stay bolt is simple and durable in construction, easily applied and arranged to prevent leakage and undue straining of the boiler sheets by allowing the bolt to expand and contract, and to permit movement of the sheets in the direction of their plane without causing injury to the stay bolt.

In order to accomplish the desired result in a simple manner use is made of a nut screwing on the bolt and a tubular plug screwing in a boiler sheet, the plug and the nut forming a ball and socket joint with each other and the plug and nut having co-acting means to hold the members of the ball and socket joint together.

A practical embodiment of the invention is represented in the accompanying drawings forming a part of this specification, in which similar characters of reference indicate corresponding parts in all the views.

Figure 1 is a sectional side elevation of the stay bolt as applied, the section being on the line 1—1 of Fig. 2; Fig. 2 is a cross section of the same on the line 2—2 of Fig. 1; Fig. 3 is a face view of the cap for closing the outer end of the plug; Fig. 4 is a sectional side elevation of a modified form of the stay bolt as applied; Fig. 5 is a similar view of another modified form of the stay bolt as applied; Fig. 6 is a reduced face view of the cap for the modified forms shown in Figs. 4 and 5; and Fig. 7 is a cross section of a portion of a boiler provided with the improved stay bolt.

The stay bolt 10 illustrated in Figs. 1 and 2 engages at its inner end the sheet 11 and at its outer end screws a nut 12 having a spherical surface 13 engaging a correspondingly shaped socket 14 formed interiorly at the inner end of a tubular plug 15 provided with an exterior screw thread 16 screwing in the outer boiler sheet 17. It will be noticed that the nut 12 and the plug 15 have a ball and socket joint connection with each other so as to allow a shifting of the sheets 11 and 17 in the direction of their plane without unduly straining the stay bolt 10, as the ball member formed by the nut 12 is free to turn in the socket 14 of the plug 15. It will also be noticed that by the arrangement described the stay bolt 10 can readily expand and contract as the nut 12 is free to move outward within the plug 15 and inward to regain its ball socket 14. In order to hold the nut 12 in loose relation readily expand and contract as the nut 12 is provided with outwardly extending lugs 18 fitting loosely into notches 19 formed on the inner end of the plug 15, it being understood that the lugs 18 loosely engage the notches to allow a swinging movement of the stay bolt 10 and lengthwise movement thereof, as above described. The plug 15 is provided in its outer end with an interior screw thread 20 in which screws a cap 21 for closing the plug 15 at the outer end thereof. The cap 21 is provided with a flange 22 abutting against the outer end of the plug 15 to limit the inward screwing movement of the cap 21, and the latter is provided in its outer face with a polygonal recess 23 for the application of a suitable tool to permit of screwing the cap 21 in position on the outer end of the plug 15 or removing it therefrom. The stay bolt 10 is provided at its forward end with the usual opening 24 for the escape of water or steam in case the stay bolt 10 is broken. In practice, the outer end of the stay bolt 10 is provided with a head 25 adapted to engage the outer face of the nut 12 after the latter is screwed in position on the stay bolt 10.

In the modified form shown in Fig. 4, the externally threaded plug 30 is provided, the interior thread being omitted and in this case use is made of a cap 31 having an internally threaded flange 32 screwing on the outer end of the plug 30. Otherwise, the construction is the same as above described so that further description of the same is not deemed necessary.

In the modified form shown in Fig. 5, the plug 32 is provided with exterior screw threads 33 and 34 of different diameters, of which the screw thread 33 screws in the crown sheet 35, and a cap 36 having an internally threaded flange 37 screws on the outer screw thread 34. Otherwise, the construction is the same as above described in reference to Fig. 1, so that further description of the same is not deemed necessary.

The caps 31 and 36 are preferably polygonal to permit convenient application of a wrench or other tool for screwing the caps in position on the plugs 30 and 32 or unscrewing the same therefrom.

By reference to Fig. 7, it will be noticed that the stay bolt shown in Fig. 4 can be readily applied to the curved portions of the inner and outer boiler sheets 11 and 17.

The outer screw threaded portion of the plug 32, shown in Fig. 5, is reduced to permit of accommodating a large number of stay bolts, plugs and caps in a given space without interference one with the other. In practice, the nut is placed in position in the plug prior to reducing the outer end thereof with the use of heat and suitable dies.

Having thus described my invention, I claim as new and desire to secure by Letters Patent:

1. A stay bolt for boilers and like structures, comprising a bolt, a tubular plug, and a nut screwing on the said bolt, the said plug and nut forming a ball and socket joint with each other and the said plug and nut having coacting means to hold the members of the said ball and socket joint together.

2. A stay bolt for boilers and like structures, comprising a bolt, a tubular plug provided at its inner end with notches, and a nut screwing on the said bolt and extending within the said plug, the plug and the nut forming a ball and socket joint with each other and the nut having lugs extending loosely in the said notches.

3. A stay bolt for boilers and like structures, comprising a bolt, a tubular plug, a nut screwing on the said bolt, the bolt having a head adapted to engage the outer end of the nut, the said plug and nut forming a ball and socket joint with each other and the said plug and nut having coacting means to hold the members of the said ball and socket joint together, and a cap screwing on the outer end of the said plug to close the latter.

4. In a stay bolt, a tubular plug provided at its inner end with an interior socket, the inner edge of the plug being provided with notches, and a nut screwing on the said bolt and held at its outer end against a head of the bolt, the nut having a spherical surface to engage a correspondingly shaped surface of said socket, the nut having outwardly extending lugs on its inner face, fitting loosely into the said notches of the plug to allow a swinging movement of the stay bolt and lengthwise movement thereof, the said nut being spaced from the outer end of the plug and free to move back and forth within the same, and a cap having a screw connection with the outer end of the tubular plug.

In testimony whereof I have signed my name to this specification in the presence of two subscribing witnesses.

HARRY A. LACERDA.

Witnesses:
WILLIAM S. RILLING,
EDWARD J. LOONAN.

Copies of this patent may be obtained for five cents each, by addressing the "Commissioner of Patents, Washington, D. C."